US008963689B2

(12) United States Patent
Gotwals

(10) Patent No.: US 8,963,689 B2
(45) Date of Patent: Feb. 24, 2015

(54) CABLE ID USING RFID DEVICES

(75) Inventor: Michael D. Gotwals, Greenwood, IN (US)

(73) Assignee: JDS Uniphase Corporation, Milpitas, CA (US)

( * ) Notice: Subject to any disclaimer, the term of this patent is extended or adjusted under 35 U.S.C. 154(b) by 1212 days.

(21) Appl. No.: 12/169,680

(22) Filed: Jul. 9, 2008

(65) Prior Publication Data

US 2009/0022067 A1 Jan. 22, 2009

Related U.S. Application Data

(60) Provisional application No. 60/950,442, filed on Jul. 18, 2007.

(51) Int. Cl.
*H04Q 5/22* (2006.01)
*H02G 3/00* (2006.01)

(52) U.S. Cl.
CPC ...................................... *H02G 3/00* (2013.01)
USPC ... 340/10.2; 340/10.1; 340/572.1; 340/572.4; 340/572.8; 370/254; 370/351

(58) Field of Classification Search
CPC ..... H04L 12/26; H04L 12/28; H04L 12/2838; H04L 12/284; H04L 12/2849; G08C 15/00; G08C 15/02; G08C 15/06; G08C 19/00; G08C 19/02; G08C 19/12
USPC ......... 340/505, 514, 531, 533, 540, 635, 652, 340/686.1, 687, 691.1, 3.1, 3.6, 5.8, 9.1, 340/10.1, 10.4, 10.42, 10.2, 572.1, 572.4, 340/572.8; 370/254, 351
See application file for complete search history.

(56) References Cited

U.S. PATENT DOCUMENTS

| | | | | | |
|---|---|---|---|---|---|
| 3,610,810 | A | * | 10/1971 | Fribley, Jr. | 174/59 |
| 3,859,457 | A | * | 1/1975 | Kirk, Jr. | 380/208 |
| 4,072,899 | A | * | 2/1978 | Shimp | 725/143 |
| 4,562,428 | A | * | 12/1985 | Harman et al. | 340/552 |
| 5,326,931 | A | * | 7/1994 | Cain et al. | 174/503 |
| 5,642,155 | A | * | 6/1997 | Cheng | 725/119 |
| 5,666,365 | A | * | 9/1997 | Kostreski | 370/486 |
| 5,777,558 | A | * | 7/1998 | Pennypacker et al. | 340/635 |
| 6,463,039 | B1 | * | 10/2002 | Ricci et al. | 370/277 |
| 6,779,091 | B2 | * | 8/2004 | Kari et al. | 711/154 |
| 7,415,062 | B1 | * | 8/2008 | Barrass et al. | 375/222 |
| 7,533,403 | B1 | * | 5/2009 | Krein et al. | 725/74 |
| 7,725,025 | B2 | * | 5/2010 | Gilbert et al. | 398/16 |
| 2003/0121060 | A1 | * | 6/2003 | McClellan | 725/153 |

(Continued)

FOREIGN PATENT DOCUMENTS

WO          90/16119          12/1990          ............... H04H 1/02

*Primary Examiner* — Steven Lim
*Assistant Examiner* — Ryan Sherwin
(74) *Attorney, Agent, or Firm* — JDS Uniphase Corporation

(57) ABSTRACT

The present invention relates to the use of RFID technology to identify specific cables in a bundle, and in particular to a cable identification device in which RFID devices are connected to the far end of a plurality of cables and splitters, and an RF measurement device is used to identify each cable from the central location. The RF measurement device provides the AC RF electrical signal power required to pass through the at least one AC couple splitter to operate the plurality of RFID devices, and includes means to identify the unique identification numbers associated with the plurality of coaxial cables from the plurality of identification signals received simultaneously.

16 Claims, 3 Drawing Sheets

(56) References Cited

U.S. PATENT DOCUMENTS

| | | | |
|---|---|---|---|
| 2003/0134599 A1* | 7/2003 | Pangrac et al. | 455/67.4 |
| 2006/0255930 A1* | 11/2006 | Berkman | 340/533 |
| 2006/0271985 A1* | 11/2006 | Hoffman et al. | 725/111 |
| 2007/0116184 A1* | 5/2007 | Gonsalves et al. | 379/1.01 |
| 2007/0133041 A1* | 6/2007 | Tredoux et al. | 358/1.15 |
| 2008/0276004 A1* | 11/2008 | Thomson et al. | 709/244 |
| 2008/0320541 A1* | 12/2008 | Zinevich | 725/127 |
| 2010/0182149 A1* | 7/2010 | Marino | 340/572.7 |
| 2010/0205629 A1* | 8/2010 | Snawerdt | 725/26 |

* cited by examiner

CABLE ID USING RFID DEVICES

CROSS-REFERENCE TO RELATED APPLICATIONS

The present invention claims priority from U.S. Patent Application No. 60/950,442 filed Jul. 18, 2007, which is incorporated herein by reference.

TECHNICAL FIELD

The present invention relates to the use of radio frequency identification (RFID) technology to identify specific cables in a bundle, and in particular to a cable identification system in which RFID devices are connected to the far end of a plurality of cables and splitters, and an RF measurement device is used to identify each cable from a central location.

BACKGROUND OF THE INVENTION

When wiring a house or a building the coax cable network is installed prior to the mounting of the dry wall being, and the network installation is completed after the dry wall has been finished. Accordingly, a technician is faced with a bundle of unlabeled cables hanging in a wiring closet, and their task is to identify each cable, label them, and connect them to the appropriate service. Install technicians from service providers are faced with a similar problem when installing a new service in a home. Typically, there is a group of cables that enter at a side of a house which terminate somewhere within the house, and it is important for a technician to be able to quickly and positively identify where each cable goes, so that new devices and services can be installed quickly and correctly.

Currently resistive based devices are used to perform the task of cable identification; however, in coax based systems, splitters prevent this technique from working effectively. Moreover, resistive devices are limited to less than thirty unique identifiers. Conventional systems that are able to work through splitters are based on active devices that are large, expensive and require batteries.

Conventional RFID systems include RFID tags positioned on everything from employees badges to carcasses of meat, and RFID readers positioned at specific stations or points of entry for reading the RFID tags, as they pass by in close proximity thereto. The RFID tags provide specific information about the item they are attached to the RFID reader to store, tabulate or act upon, e.g. allow access.

RFID tags are tiny microchips with memory and an antenna coil, which can be thinner than paper, e.g. only 0.3 mm across. RFID tags listen for a radio signal sent by the RFID reader. When an RFID tag receives the radio signal query, it responds by transmitting a unique identification code and other data back to the RFID reader.

There are two types of RFID tags: passive RFID tags, and active RFID tags. Passive RFID tags can be as small as 0.3 mm and don't require batteries, as they are powered by the radio signal of the RFID reader, which "wakes them up" to request a reply. Passive RFID tags can be read from a distance of about 20 feet. Semi-passive RFID tags contain a small battery that boosts the range. Passive tags are generally read-only, meaning the data they contain cannot be altered or written over. Active RFID tags, also called transponders, because they contain a transmitter that is always "on", are powered by a battery, about the size of a coin, and are designed for communications up to 100 feet from the RFID reader. Active RFID tags are larger and more expensive than passive RFID tags, but can hold more data about the product, and are commonly used for high-value asset tracking. Active RFID tags may be read-write, i.e. data contained therein can be written over.

RFID readers are used to query RFID tags in order to obtain identification, location, and other information about the device or product to which the tag is attached. RF energy from an antenna on the RFID reader is collected by the antenna on the RFID tag and used to power up the microchip on the RFID tag.

There are two types of RFID readers: RFID read-only readers and RFID read-write readers. RFID read-only readers can only query or read information from a nearby RFID tag, and are found in fixed, stationery applications, as well as portable, handheld varieties. RFID read-write readers, also known as encoders, read and also write, i.e. change, information in an RFID tag. Such RFID encoders can be used to program information into a "blank" RFID tag. A common application is to combine an RFID reader with a barcode printer to print "smart labels", which contain a UPC bar code on the front and an RFID tag embedded on the back.

The antennas on the RFID reader and the RFID tag each have a coil, which together form a magnetic field. The RFID tag draws electrical energy from this field, which powers the microchip therein. The microchip then changes the electrical characteristics of the tag antenna, which are sensed up by the reader antenna and converted into a serial number for the RFID tag There are 4 major frequency ranges that RFID systems operate at. Normally, low-frequency systems are distinguished by short reading ranges, slow read speeds, and lower cost. Higher-frequency RFID systems are used in which longer read ranges and fast reading speeds are required, e.g. vehicle tracking and automated toll collection. Microwave frequencies requires the use of active RFID tags.

| | | | |
|---|---|---|---|
| Low-frequency 125-148 KHz | 3 feet | $1+ | Pet and ranch animal identification; car keylocks |
| High-frequency 13.56 MHz | 3 feet | $0.50 | library book identification; clothing identification; smart cards |
| Ultra-high freq 915 MHz | 25 feet | $0.50 | Supply chain tracking: Box, pallet, container, trailer tracking |
| Microwave: 2.45 GHz | 100 feet | $25+ | Highway toll collection; vehicle fleet identification |

The 13.56 MHz solution was developed in an effort to lower the cost of RFID tags, and address applications of high quantity tags usage. At 13.56 MHz, a tag's antenna coil need not be made of hard copper wrappings, and can actually be a printed ink on a paper-like substrate, to which an EEPROM is added. Typical applications include: library books, laundry identification, access control, OEM applications.

Both power and bi-directional communications form the air interface between the RFID tags and the reader device. It is the flexibility of the interface to select one or two sub-carriers when communicating from RFID tags to reader device, whilst also using slow or fast data rates from the reader device to the RFID tags, that allows systems to be tuned to suit different operational requirements ranging from use with high RF noise at short range to low RF noise at long range. ISO/IEC 15693 forms part of a series of International Standards that specify a vicinity or contactless tag. ISO/IEC 15693-2:2006 defines the power and communications interface between the tag and the reading device. Other parts of ISO/IEC 15693 define the physical dimensions of the tag and the commands interpreted by the tag and reading device.

Published WIPO Application WO90/16119, entitled Cable Identification System and Method, filed by Brent James, teaches probing each individual coaxial cable at the junction box using a one-to-one communication protocol powered by DC electricity. Unfortunately, the reading device is unable to supply DC power to a plurality of identification devices across a splitter, which is AC coupled. Consequently, the James reference teaches probing one RFID at a time with DC power and with no splitters in the line, whereby sufficient power is available from the test meter to operate the RFID.

An object of the present invention is to overcome the shortcomings of the prior art by providing a passive RFID device to identify installed cables even if the cable has splitters or actives inline using a communication protocol enabling many devices to be read simultaneously. Accordingly, all the identification devices on all the coaxial cable ends can be probed in a single operation.

SUMMARY OF THE INVENTION

Accordingly, the present invention relates to a system for simultaneously determining locations of a plurality of coaxial cable outlets connected to a coaxial cable inlet with at least one AC coupled splitter therebetween, comprising:

a cable identification device connected to each of the plurality of coaxial cables outlets, wherein each cable identification device comprises:

an integrated circuit having a unique identification number stored in electronic memory for association with a respective one of the coaxial cable outlets;

a power converter for converting an AC RF electrical test signal into power to operate the integrated circuit; and a responsive circuit for sending a response signal including an RF identification signal containing the unique identification number upon receiving the test signal; and a reader device for positioning at the coaxial cable inlet for sending the AC RF electrical test signal to each of the cable identification devices, and for receiving the response signals from the cable identification devices;

wherein the reader device provides the AC RF electrical test signal with enough AC RF electrical signal power required to pass through each AC coupled splitter to operate the plurality of cable identification devices; and wherein the reader device stores or displays the unique identification numbers associated with each of the cable identification devices from the plurality of RF identification signals received.

Another aspect of the present invention relates to a method of mapping a cable network, which includes: a plurality of coaxial cable branches extending from a network input; at least one AC coupled splitter; a plurality of sub-branches extending from each AC coupled splitter; and an outlet at the end of each sub-branch, comprising the steps of:

a) connecting a plurality of RF cable identification devices to each of the outlets;

b) sending an AC RF electrical test signal from a reader device positioned at the network input onto one of the cable branches through any AC coupled splitters to the plurality of RF cable identification devices at the outlets thereof, each of which in response thereto sends a response signal with an RF identification signal containing a unique identification number back to the reader device;

c) identifying the unique identification numbers associated with the outlets from the plurality of identification signals received;

d) repeating steps b) and c) for each of the other cable branches; and e) mapping the cable network for storage in memory or display.

BRIEF DESCRIPTION OF THE DRAWINGS

The invention will be described in greater detail with reference to the accompanying drawings which represent preferred embodiments thereof, wherein:

FIG. 2a is a schematic of an RFID device in accordance with FIG. 1;

FIG. 2b is a side view of the RFID device of FIG. 2a; and

DETAILED DESCRIPTION

Figure 1:
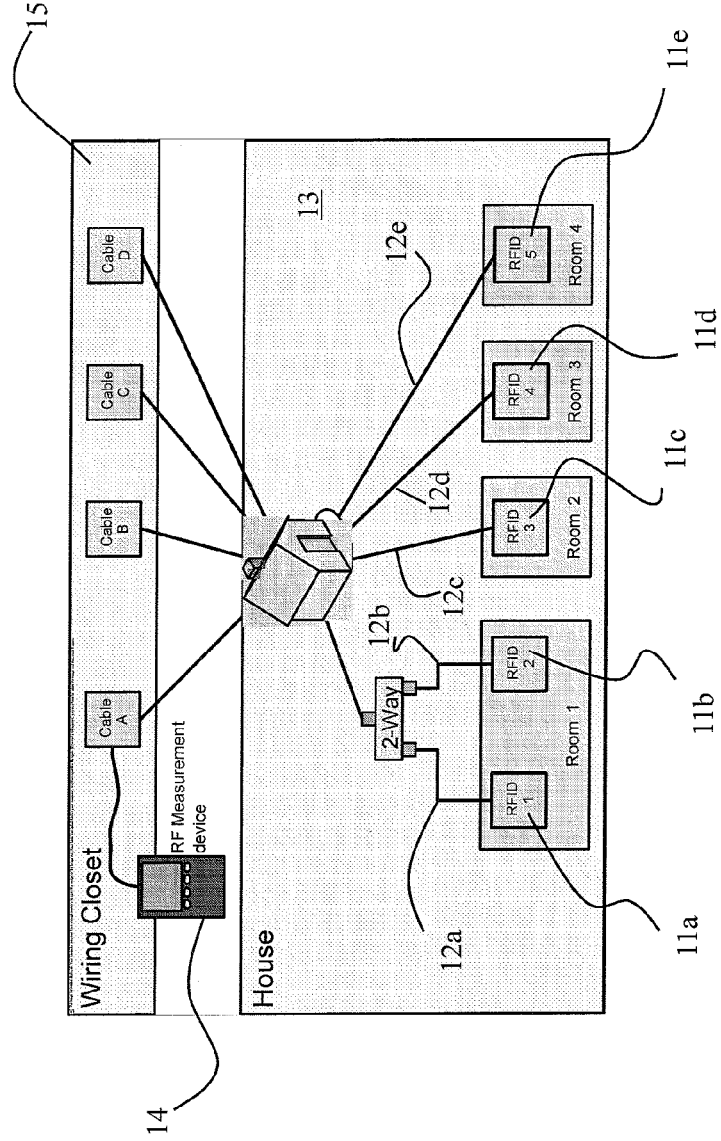
FIG. 1 is a schematic diagram of a CATV network in a building.

With reference to FIG. 1, a unique radio frequency identification (RFID) device 11a to 11e is connected to the far end of each coax cable 12a to 12e in each room of a building 13 temporarily or permanently by a technician, who records the location and unique identifier of each RFID device 11a and 11e. A radio frequency (RF) measurement device 14 is located by the technician in a position in which all the coax cables 12a to 12e from the building 13 converge, e.g. a wiring closet 16 or a side of the building 13. Sometime during the process, the technician enters which RFID device 11a to 11e correspond to which location and room in the building 13 into the RF measurement device 14. Subsequently, the RF measurement device 14 is connected to each coax cable 12a to 12e consecutively in turn, and the RF measurement device 14 sends a radio frequency (RF) test signal down each coax cable 12a to 12e to the respective RFID device 11a to 11e. Each RFID device 11a to 11e receives the test signal and generates a response signal, which is transmitted back down the coax cable 12a to 12e under test, and received by the RF measurement device 14. The RF measurement device 14 detects the presence of each uniquely numbered RFID device 11a to 11e connected to each cable 12a to 12e, thereby enabling the technician to quickly identify marked and unmarked cables, even if those cables have splitters or actives inline. With the knowledge of where the far end of each cable is, the technician can quickly connect the proximate ends of the cables to the correct locations in the wiring closet 15, label each cable, and test individual cables, as required.

Passive RFID devices 11a to 11e have no internal power supply. A small amount of electrical current is induced in an antenna on the RFID device 11a to 11e by the incoming RF test signal from the RF measurement device 14, which provides just enough power for a CMOS integrated circuit in the RFID devices 11a to 11e to power up and transmit the response signal. Preferably, the RFID devices 11a to 11e transmit the response signal by backscattering the carrier signal from the incoming RF test signal, which is modulated to transmit data. Accordingly, the antenna on the RFID devices 11a to 11e has to be designed to both collect power from the incoming RF test signal, and to transmit the backscatter response signal. The response of the passive RFID devices 11a to 11e is not necessarily just an ID number; the tag chip can contain non-volatile EEPROM for storing data. Each RFID device 11a to 11e has a label with a simple identification number (1-8) printed thereon. The user of the system expect these simple identification numbers on the reader. The RFID device's simple identification number is stored in the EEPROM, and read out when an RFID device is found. Non-silicon ID devices made from polymer semiconductors are currently being developed by several companies globally.

Figures 2A, 2B:
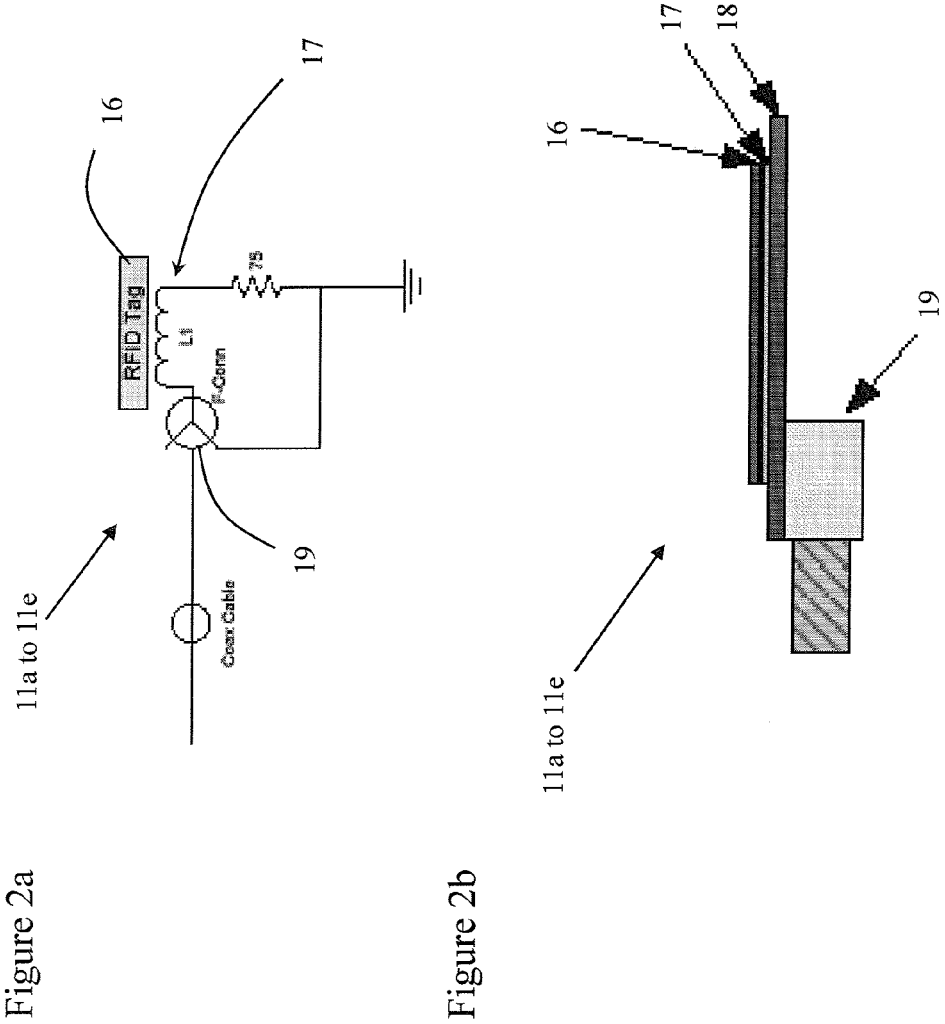

The RF measurement device 14 emits an AC power test signal at a suitable frequency, e.g. between 5 MHz and 25 MHz, but 13.56 MHz according to ISO/IEC 15693-3 protocol, which is incorporated herein by reference, is preferable. With reference to FIGS. 2a and 2b, in accordance with a preferred embodiment of the present invention, the RFID devices 11a to 11e include an RFID tag 16 placed over a small antenna 17 etched on a PC board 18. The PC board 18 is coupled to an F-Type connector 19, which is pluggable into the coax network to be tested. The RF measurement device 14 sends the 13.56 MHz test signal to the antenna 17 on each of the RFID devices 11a to 11e, simultaneously if connected to the same cable, e.g. 12a and 12b, and in succession for the different cables, via the coax cables 12c to 12e. The RF power test signal must have a frequency that enables the propagation of electromagnetic waves through the co-axial cable 12a to 12e and the AC coupled splitters with low loss. The RFID devices 11a to 11e are comprised of a small integrated circuit (IC), which is powered via the power test signal. In most applications of RFID devices, the radio frequency signals propagates through air; however, the 13.56 MHz signal frequency is selected for the test signal in the present invention because this frequency propagates through the co-axial cable 12a to 12e, and the RFID devices 11a to 11e operate at a very low power. Furthermore, the RFID devices 11a to 11e are mass produced for other applications and are available commercially at a very low cost.

Power is coupled to the RFID device 11a to 11e by an AC field produced in the RF measurement device 14, the powering field has a frequency of 13.56 MHz, which is one of the industrial, scientific and medical (ISM) frequencies available for worldwide use. When sufficient power is received by the RFID devices 11a to 11e, they are able to respond to commands sent from the RF measurement device 14. The RF measurement device 14 sends commands to the RFID devices 11a to 11e by modulating the powering field and by using a modulation system known as pulse position modulation, whereby the position of a single pulse relative to a known reference point codes the value of a nibble or byte of data, which enables the RFID device 11a to 11e to draw the maximum energy from the field almost continuously.

An RFID device 11a to 11e only respond after receiving a valid command that selects a single RFID device from a possible collection of RFID devices connected to the RF measurement device 14, i.e. connected to the end of the selected cable 12a to 12e directly or through a splitter. The process of collision detection and selection, also known as anti-collision, is made possible by detecting the unique identification number encoded into every RFID device 11a to 11e. Anti-collision and the commands used are defined in ISO/IEC 15693-3. The ISO 15693 standard defines a algorithm for the response, such that the devices generally don't response simultaneously, they respond in an address slot. The ISO 15693 standard algorithm also defines a method for handling the collision caused by RFIDs that respond simultaneously, which can occur if the RFID devices 11a to 11e have similar unique identification numbers.

The RFID device 11a to 11e responds to the RF measurement device 14 by drawing more or less power from the field and generates one or two sub-carriers of around 450 kHz, which are switched on and off to provide Manchester-encoded data that are then detected by the RF measurement device 14.

Each RFID device 11a to 11e has a laser tuned tank circuit with a rectifier circuit, which will efficiently convert the test power signal to a DC supply voltage to power the IC. Each RFID device 11a to 11e is manufactured with a unique ID embedded in its memory. However, in the invention the RF measurement device 14 can provide sufficient power to operate all the RFID devices, e.g. 11a and 11b, that are connected to the RF measurement device 14 via the connected coaxial cables, e.g. 12a and 12b, having splitters in the line. Thus all the cable ends are identified in one operation.

When the IC in each of the RFID devices 11a to 11e is powered up they will listen for commands from the RF measurement device 14, i.e. the source of the 13.56 MHz test signal. The RF measurement device 14 sends commands to the RFID devices 11a to 11e through modulation of the test signal. Each RFID device 11a to 11e can respond to a number of commands, but the command of interest in accordance with the present invention is an inventory command. When any one of the RFID devices 11a to 11e receives an inventory command, the RFID device 11a to 11e will respond with a unique identification (ID) signal including the respective unique ID. The ID response signal is sent via a serial data stream by modulating a transistor connected to the tank circuit. The transistor is configured to short out the tank circuit and cause a standing wave pattern that an integrated circuit IC in the RF measurement device 14 can detect and decode, i.e. the RFID devices 11a to 11e never transmits a signal of their own.

A relative signal strength index (RSSI) value can also be read by the measurement device 14 from the response signal. The RSSI is used as an indicator of the loss between the measurement 14 and the RFID devices 11a to 11e.

In a simple embodiment, the technician only sees the unique identification numbers on a cable under test, e.g. 1 thru 8, on the display screen of the measurement device 14, and then references a previously filled memory location in the measurement device 14 to get the corresponding position of the RFID device 11a to 11e, whose identification number is displayed on the measurement device 14. Alternatively, the corresponding position to identification number mapping can also be done by control software/hardware inside the measurement device 14.

The information is then saved in memory on the RF measurement device 14 and/or displayed on a display screen provided on the RF measurement device 14 to inform the user which of the RFID devices 11a to 11e are connected to the particular cable 12a to 12e, and therefore where the end of the particular cable is located in the building 13. If two or more RFID devices 11a to 11e respond, then the user knows that the coax network must contain RF splitters. During installation, it is important that the user find a cable run that contains no splitters for residential gateways and/or very high speed digital subscriber lines (VDSL) to maximize throughput and minimize losses caused by splitters.

Figure 3:
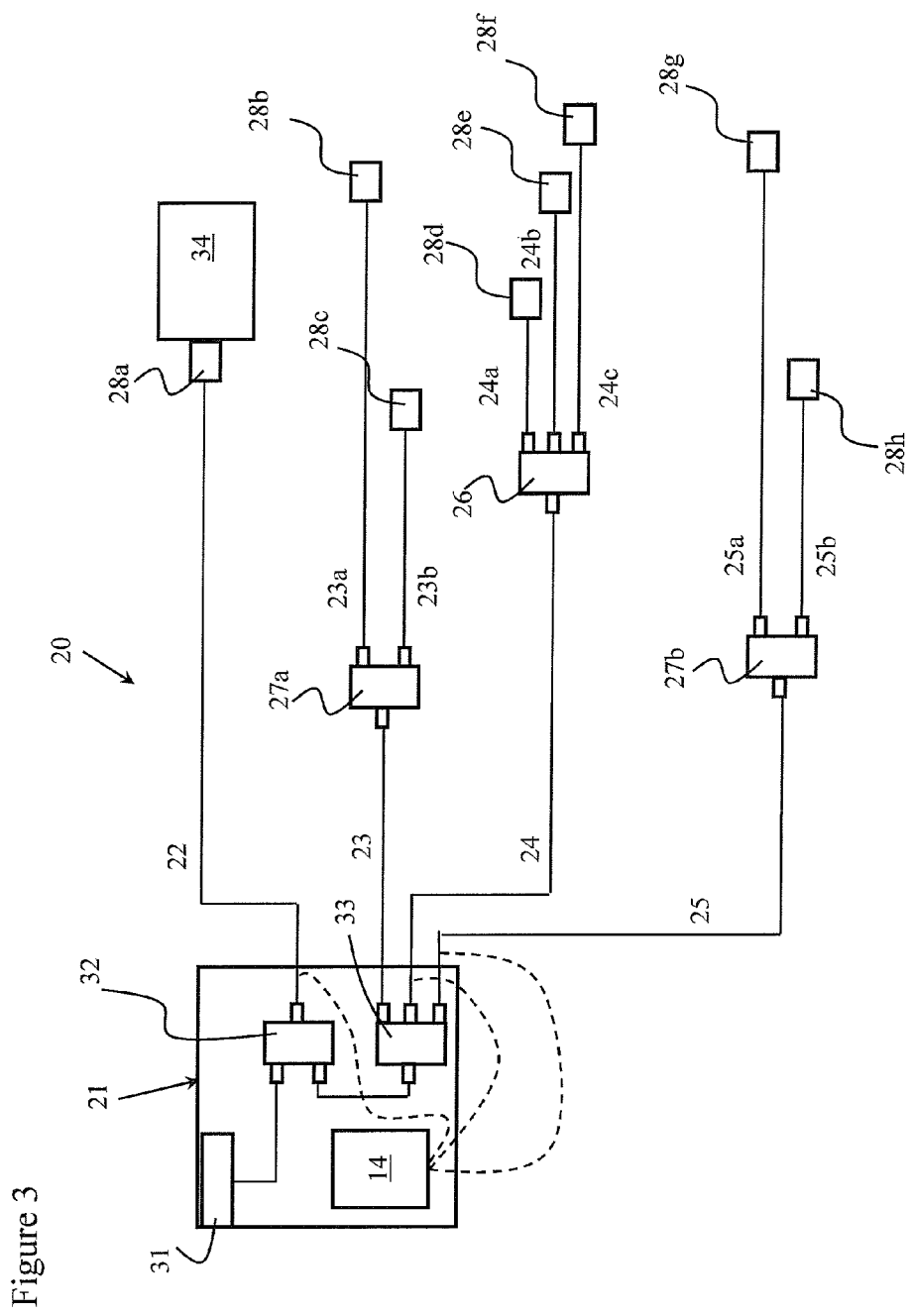
FIG. 3 is a schematic diagram of a CATV network from a network interface device to a building.

With reference to FIG. 3, a home network 20 is illustrated extending from the network's inlet, i.e. a network interface device (NID) 21, to four main branches 22 to 25, three of which divide into eight sub-branches 23a, 23b, 24a, 24b, 24c, 25a and 25b via a first, e.g. high quality, splitter 26 and second and third, e.g. low quality, splitters 27a and 27b. The network's inlet can be anywhere in the network from which one or more cables originate and terminate elsewhere, but typically is the location at which the coaxial cable enters the building from the exterior at some form of junction box. In use, an installation technician places an RFID device 28a to 28h (same as 11a to 11e above) at an outlet at the end of each branch or sub-branch, e.g. on each wall jack in the house, and records where, e.g. which location and/or room, each outlet and RFI device 28a to 28h are located. Then the technician relocates to the NID 21, located inside or outside the house, and performs a cable ID test by initiating the AC RF test signal from an RF measurement device 14 on each one of the branches 22 to 25 sequentially. The results of the test identifies, which sub-branches 23a, 23b, 24a, 24b, 24c, 25a and 25b are connected to each branch 22 to 25, and to which locations in the house the sub-branches 23a, 23b, 24a, 24b, 24c, 25a and 25b extend. In FIG. 2, the cable branch 22 would respond with a single ID signal, the cable branches 23 and 25 would respond with two ID signals, i.e. indicating the presence of the second and third splitters 27a and 27b, and the cable branch 24 would respond with three ID signals, i.e. indicating the presence of the first splitter 26. The RF measurement device 14 is able to differentiate between the different ID signals simultaneously being transmitted thereto.

The NID 21 includes a VDSL balun 31, which is a passive electronic device that converts between balanced and unbalanced electrical signals; a diplexer 32, which directs incoming signals to a main splitter 33 and which directs incoming and outgoing signals to and from a residential gateway (RG) 34 or host computer for internet access. Ideally the cable branch 22 that extends from the Diplexer 32 to the RG 34 must be a home run (minimal loss) due to the affect loss has on the data rates of VDSL.

I claim:

1. A system for mapping connections from a network inlet to a plurality of coaxial cable outlets connected via a plurality of branches, at least one branch with a plurality of sub-branches, a coaxial cable inlet and an unknown number of alternating current (AC) coupled splitters therebetween in an end user's coaxial cable network, comprising:

a cable identification device connected to each of the plurality of coaxial cables outlets, wherein each cable identification device comprises:

an integrated circuit having a unique identification number stored in electronic memory for association with a respective one of the coaxial cable outlets;

a power converter including an antenna for receiving and converting an AC radio frequency (RF) electrical test signal into current to power the integrated circuit; and a responsive circuit for sending a response signal including an RF identification signal containing the unique identification number upon receiving the AC RF electrical test signal; and a reader device for positioning at each coaxial cable inlet, for sequentially sending the AC RF electrical test signal down each branch, thereby, for each branch in sequence, simultaneously sending the AC RF electrical test signal to each of the cable identification devices in each sub-branch of the branch, and receiving the response signals from the cable identification devices in each sub-branch of the branch;

wherein the reader device provides the AC RF electrical test signal with AC RF electrical signal power required to pass through each AC coupled splitter to simultaneously operate the plurality of cable identification devices in the sub-branches of each branch;

wherein the reader device is capable of differentiating between a plurality of response signals received simultaneously from the plurality of sub-branches in a selected branch;

wherein the reader device stores or displays the unique identification numbers associated with each of the cable identification devices from the plurality of RF identification signals received; and wherein the reader device maps the coaxial cable outlets, and the sub-branches connected to the coaxial cable inlet of each branch for storage in memory or display using the unique identification numbers associated with the outlets from the plurality of RF identification signals received, and the locations of the RF cable identification devices previously stored therein.

2. The system according to claim 1, wherein the reader device emits the AC RF electrical test signal at a frequency between 5 MHz and 25 MHz.

3. The system according to claim 1, wherein the reader device emits the AC RF electrical test signal at 13.56 MHz according to ISO/IEC 15693-3 protocol.

4. The system according to claim 1, wherein the reader device includes: a memory for storing the unique identification numbers of each cable identification device and the corresponding position thereof; and a controller for accessing the memory when the RF identification signals are received with the corresponding identification number to simultaneously determine the position of each of the cable identification devices.

5. The system according to claim 1, wherein the power converter includes a tank circuit with a rectifier circuit for converting the AC RF electrical test signal to a DC supply voltage to provide enough power for the integrated circuit to power up and transmit the response signal.

6. The system according to claim 5, wherein the antenna generates the response signal by backscattering a carrier signal from the AC RF electrical test signal.

7. The system according to claim 6, wherein the backscattered carrier signal from the AC RF electrical test signal is modulated to include the unique identification number.

8. The system according to claim 5, wherein the response signal includes a relative signal strength index to provide an indicator of loss between the cable identification device and the reader device.

9. A method of mapping an end user's coaxial cable network, which includes: a plurality of coaxial cable branches extending from a network input; an unknown number of alternating current (AC) coupled splitters; a plurality of sub-branches extending from each AC coupled splitter; and an outlet at the end of each sub-branch, comprising the steps of:

a) connecting a radio frequency (RF) cable identification device to each of the outlets, and recording the location of each RF cable identification device, each RF identification device including an antenna for receiving and converting an AC RF electrical test signal into current to power up the RF identification device;

b) sending an AC RF electrical test signal from a reader device positioned at the network input onto one of the coaxial cable branches through any AC coupled splitter to each sub-branch and the plurality of RF cable identification devices at the outlets thereof, each of which in response thereto powers up and sends a response signal with an RF identification signal containing a unique identification number back to the reader device, which differentiates between a plurality of response signals received simultaneously from the plurality of sub-branches in a selected branch;

c) repeating step b) for each of the coaxial cable branches in the network; and d) mapping connections between the network input and the coaxial cable outlets for each branch and sub-branch for storage in memory or display using the unique identification numbers associated with the outlets from the plurality of RF identification signals received, and the locations of the RF cable identification devices.

10. The method according to claim 9, wherein the reader device emits the AC RF electrical test signal at 13.56 MHz according to ISO/IEC 15693-3 protocol.

11. The method according to claim 9, wherein the reader device emits the AC RF electrical test signal at a frequency between 5 MHz and 25 MHz.

12. The method according to claim 11, wherein step c) comprises searching memory locations in the reader device of RF cable identification devices and corresponding outlets.

13. The method according to claim 11, wherein each response signal includes a relative signal strength index to provide an indicator of loss between the cable identification device and the reader device.

14. The method according to claim 9, wherein each RF cable identification device comprises an integrated circuit with the antenna for receiving the AC RF electrical test signal, and a tank circuit with a rectifier circuit for converting the AC RF electrical test signal into a DC supply voltage to provide enough power for the integrated circuit to power up and transmit the response signal.

15. The method according to claim 14, wherein step b) includes generating the response signal with the antenna by backscattering a carrier signal from the AC RF electrical test signal.

16. The method according to claim 15, wherein step b) includes modulating the backscattered carrier signal from the AC RF electrical test signal to include the unique identification number.

* * * * *